L. PAGEL.
GATHERING AND COCKING MACHINE.
APPLICATION FILED OCT. 20, 1920.

1,416,972.

Patented May 23, 1922.
3 SHEETS—SHEET 2.

Fig. 2.

Inventor
Louis Pagel
By D. Swift
Attorney

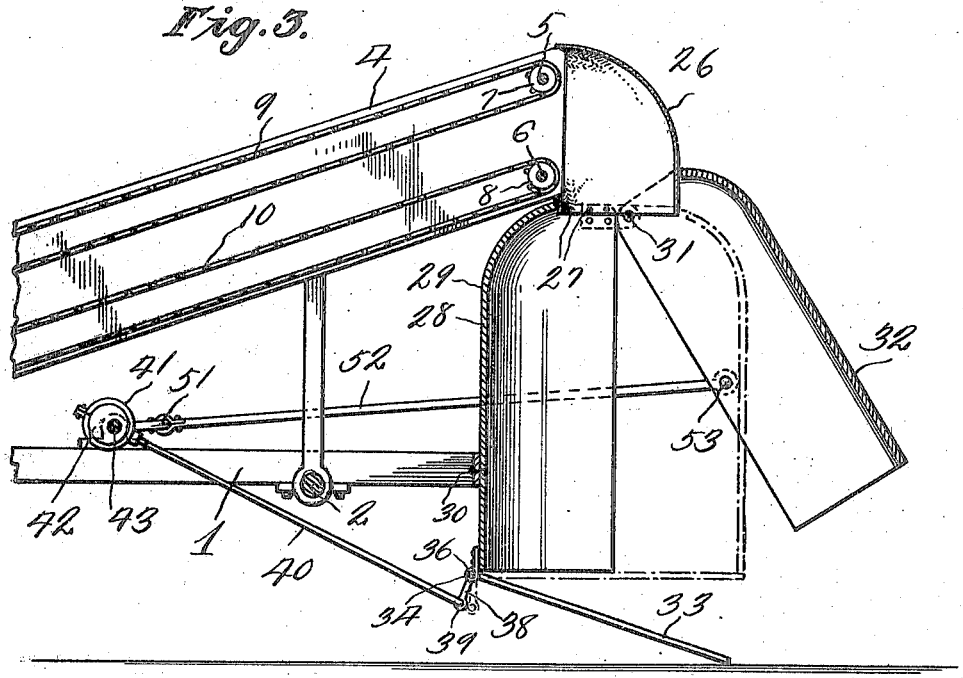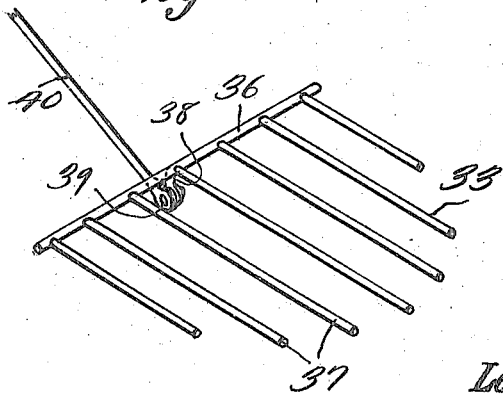

UNITED STATES PATENT OFFICE.

LOUIS PAGEL, OF FORESTVILLE, WISCONSIN.

GATHERING AND COCKING MACHINE.

1,416,972.  Specification of Letters Patent.  Patented May 23, 1922.

Application filed October 20, 1920. Serial No. 418,300.

*To all whom it may concern:*

Be it known that I, LOUIS PAGEL, a citizen of the United States, residing at Forestville, in the county of Door, State of Wisconsin, have invented a new and useful Gathering and Cocking Machine; and I do hereby declare the following to be a full, clear, and exact description of the invention, such as will enable others skilled in the art to which it appertains to make and use the same.

The invention relates to gathering and cocking devices wherein hay or any other material will be gathered, conveyed over conveyors and deposited in a receptacle, which receptacle is so constructed that it may be opened and the contents thereof deposited on the ground at the will of the operator.

A further object is to provide a cocking device for use in connection with harvesting machines of the conveyor type, said cocking device comprising a vertically disposed container located beneath the rear end of the conveyor and into which container the harvested material is deposited. Also to form the container in sections one of said sections being fixed to the machine and the other section pivotally connected to the fixed section at its upper end and to provide a pivoted bottom for the receptacle as a whole, said pivoted section and pivoted bottom being operable through a rotatable shaft having connecting rod and crank connections with the pivoted section and connecting rod and eccentric connections with the pivoted bottom.

A further object is to provide lever and clutch means whereby the cocker controlling shaft may be rotated for opening the receptacle and allowing the material therein to be deposited on the ground, in piles.

A further object is to form the pivoted bottom from a bar having spaced fingers thereby allowing the hay or other material when the bottom is pivoted downwardly to engage the ground between the fingers and allow the fingers to slide out of engagement with the material without dragging the hay along with the same.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 2 is a top plan view.

Figure 3 is an enlarged detail view showing the rear end of the machine and cocker in section showing the cocker open.

Figure 4 is a perspective view of the pivoted bottom of the cocker.

Figure 5 is a sectional view taken on line 5—5 of Figure 2.

Figure 6 is a perspective view of the chain spacing and guiding member.

Figure 1:
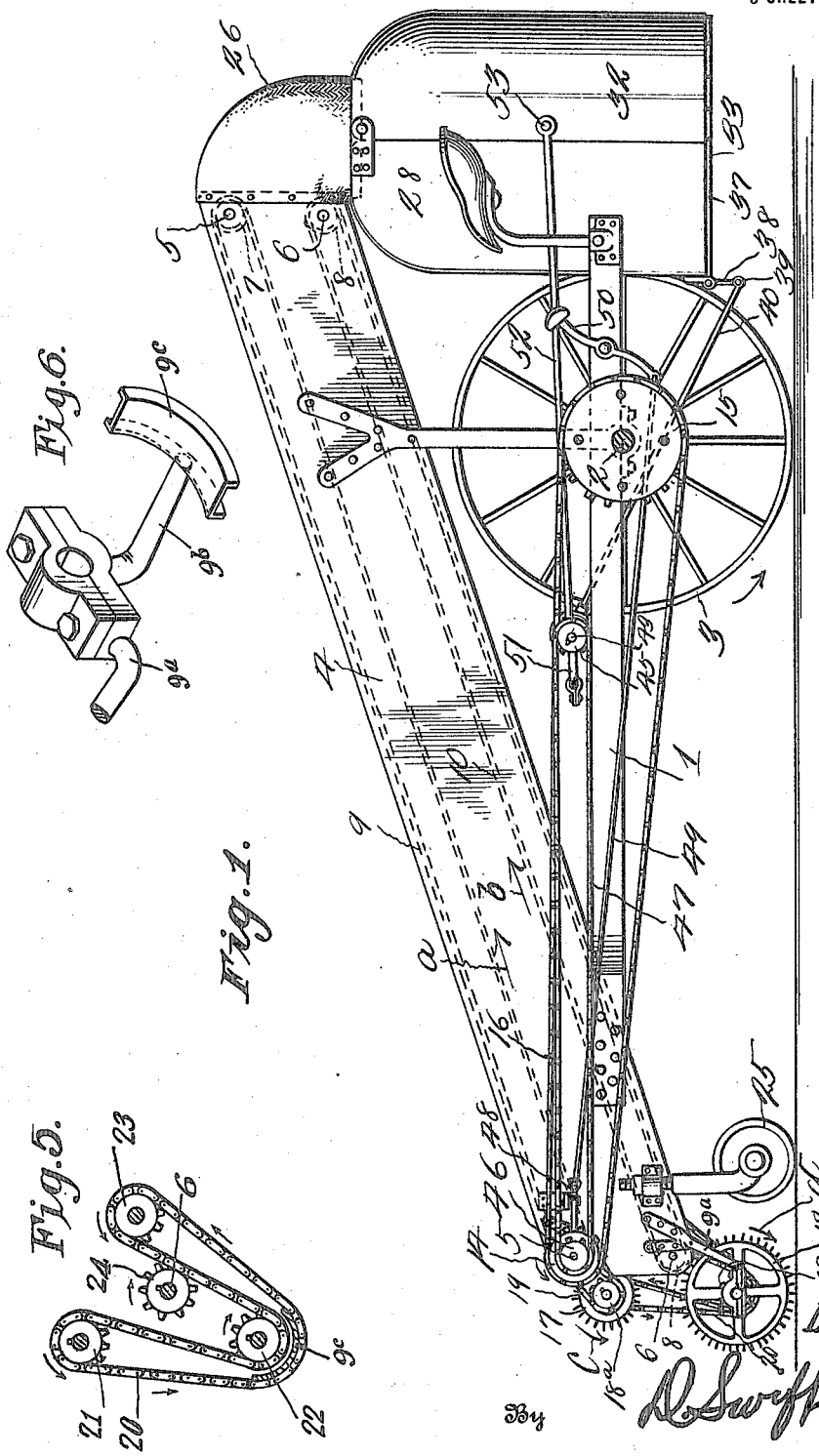
Figure 1 is a side elevation of a gathering and cocking machine.

Referring to the drawings, the numeral 1 designates a frame, in bearings of which frame the axle 2 is rotatably mounted, said axle having secured to its ends supporting wheels 3, which also rotate with the axle as the machine moves forwardly. Supported on the frame 1 are spaced conveyor sides 4, in bearings of which sides conveyor shafts 5 and 6 are mounted, said shafts being provided with rollers 7 and 8 around which rollers the endless conveyor chains 9 and 10 extend. Conveyor chains 9 are moved in the direction of the arrow $a$ and conveyor chains 10 in the direction of the arrow $b$ through mechanism hereinafter described. Secured to one end of the shaft 5 are spaced clutch members 11 and 12 and slidably mounted and also loosely mounted on the shaft 5 is a slidable double clutch member 13, which member may be moved into engagement with the clutch member 11 or with the clutch member 12 as desired. Clutch member 13 is provided with a sprocket 14 and extending around said sprocket 14 and around a sprocket 15 carried by the axle 2 is a sprocket chain 16. When the machine moves forwardly and the axle 2 is rotated the clutch member 13 will be rotated through the medium of the sprocket chain 16, thereby rotating the shaft 5 which operates the conveyor chains 9. Rotatably mounted in bearings of brackets $9^a$ carried by the forward ends of the sides 4 are the pintles of gathering rollers 17 and 18. The roller 17 is rotated in the direction of the arrow $c$ through sprocket and chain connections $18^a$ and 19 with the shaft 5. It will be seen that material which is engaged by the roller 17 will be moved inwardly and fed between the conveyor chains 9 and 10 so that said conveyor chains will move the same upwardly and rearwardly. Feeding roller 18 is rotated in the direction of the arrow $d$ by means of the chain 20 which passes around a sprocket 21 thence downwardly under a sprocket 22 and upwardly around an idle sprocket 23 as shown in Figures 1 and 5. One side of the chain 20 engages the sprocket 24 which is carried by the shaft 6 thereby causing said shaft to be rotated and the conveyor chains 10 to move in the direction of the arrow $b$ simultaneously with the movement of the chains 9 in the direction of the arrow $a$. It will be seen that rollers 17 and 18 will feed material between the conveyor chains 9 and 10 and that said conveyor chains will convey the material upwardly and rearwardly. One of the brackets 9$^a$ is provided with a downwardly and outwardly extending arm 9$^b$ which supports a segmentally shaped channel member 9$^c$, said channel member being disposed beneath the sprocket 22 and forms means for spacing one side of the sprocket chain 20 from the other side adjacent the sprocket 23 and guiding the chain in its movement.

The forward end of the machine is supported on wheels 25 and the machine as a whole may be propelled in any way desired. Secured to the rear ends of the sides 4 of the conveyors is a rearwardly and downwardly extending elbow 26, to the lower end of which is secured as at 27 a fixed segmentally shaped section 28 of a cocker 29. The said section 28 of the cocker is also secured at 30 to the frame 1 for bracing and supporting the same. The cocker 29 is vertically disposed and the section 28 has pivotally connected thereto as at 31 a segmentally shaped section 32, which section is adapted to be pivoted outwardly during a discharging operation. The lower ends of the sections 28 and 32 are open, however they are normally closed by means of the pivoted bottom 33 which is pivoted as at 34 to the lower end of the section 28. The bottom 33 comprises a bar 36 having a plurality of spaced fingers 37, which normally close the bottom of the cocker and hold the material which is deposited therein by the conveyor, until it is desired to open the cocker and deposit the contents thereof on the ground. Extending downwardly from the bar 36 of the bottom 33 is an arm 38, to the lower end of which arm is pivoted as at 39 a connecting rod 40, said connecting rod extending forwardly and upwardly and terminating in an eccentric yoke 41 which surrounds eccentric 42 carried by the rotatable shaft 43. The rotatable shaft 43 is rotatably mounted in bearings 44 of the frame 1 and has secured to one of its ends a sprocket 45, around which sprocket and a sprocket 46 carried by the clutch member 12, a sprocket chain 47 extends. The clutch 12 is loosely mounted on the shaft 5, therefore it will be seen that the rotatable shaft 43 will normally be idle until the clutch 13 is moved into engagement with the same. Clutch 13 is controlled through the bell crank 48, connecting rod 49 and foot lever 50. When the clutch member 13 is in engagement with the clutch member 12, shaft 43 will be rotated, the operator controlling the clutch 13 so that one half revolution of the shaft 43 will be accomplished. When the shaft 43 rotates one half revolution the eccentric 42 will cause the pivoted bottom 33 to pivot downwardly. During this partial rotation the cranks 51 of the shaft 43 will move rearwardly to the position shown in Figure 3, thereby forcing connecting rods 52 rearwardly and as the connecting rods 52 are pivotally connected as at 53 to the pivoted cocker section 32, it will be seen that said section 32 will be simultaneously moved outwardly at its lower end, at the same time that the free end of the pivoted bottom 33 moves downwardly, thereby discharging the contents of the cocker 29 onto the ground at the same time that the machine is moving forwardly. The fingers 37 of the pivoted bottom 33 will move out of the deposited material after which the clutch 13 may be again thrown into engagement with the clutch 12 for making another half revolution of the shaft 43 which will cause the pivoted section 32 to close and also cause the pivoted bottom 33 to close.

From the above it will be seen that a cocker is provided for use in connection with harvesting machines which is under the control of the operator at all times and one wherein the action is positive and the operation controlled through clutch mechanism in such a manner that the cocker may be opened and closed through the medium of the engagement with the ground of the wheels of the machine.

The invention having been set forth what is claimed as new and useful is:—

1. The combination with a gathering device of the character described having a conveyor supported on wheels and operable from said wheels, of a cock forming device extending downwardly from the rear end of said conveyor, said cock forming device comprising a pivoted section, said pivoted section being pivotally connected to the upper end of a stationary section, a pivoted bottom pivotally connected to the bottom of the stationary section, means for simultaneously lowering the bottom and opening the cocker sections, said means comprising a rotatable shaft having cranks, link connections between said cranks and the pivoted cocker section, an eccentric carried by said shaft, an eccentric strap surrounding said eccentric, said eccentric strap being secured to a rod, the free end of said rod being connected to an arm carried by the pivoted bottom and means whereby said shaft may be rotated through mechanism operated by a forward movement of the gathering and cocking device.

2. The combination with a cocking device comprising a receptacle having a rearwardly movable pivoted section and a downwardly movable bottom closure pivoted to the bottom of the receptacle and provided with a downwardly extending operating arm, of means for simultaneously moving rearwardly the rearwardly movable portion of the receptacle and the downwardly movable bottom, said means comprising a rotatable shaft having cranks, connecting rods connecting said cranks to the rearwardly movable member, an eccentric carried by the shaft and having an eccentric rod connection with the downwardly extending arm of the bottom.

In testimony whereof I have signed my name to this specification in the presence of two subscribing witnesses.

LOUIS PAGEL.

Witnesses:
W. H. BASTAR,
L. J. GERONDALE.